(12) United States Patent
Streete

(10) Patent No.: US 9,722,855 B1
(45) Date of Patent: Aug. 1, 2017

(54) CAPABILITIES SERVICE FRAMEWORK

(71) Applicant: VCE Company, LLC, Richardson, TX (US)

(72) Inventor: Jonathan Peter Streete, Richardson, TX (US)

(73) Assignee: VCE Company, LLC, Richardson, TX (US)

( * ) Notice: Subject to any disclaimer, the term of this patent is extended or adjusted under 35 U.S.C. 154(b) by 264 days.

(21) Appl. No.: 14/085,549

(22) Filed: Nov. 20, 2013

(51) Int. Cl.
  *G06F 15/173* (2006.01)
  *H04L 12/24* (2006.01)
  *H04L 29/08* (2006.01)

(52) U.S. Cl.
  CPC ............. *H04L 41/00* (2013.01); *H04L 41/24* (2013.01); *H04L 67/10* (2013.01); *H04L 67/2809* (2013.01)

(58) Field of Classification Search
  CPC ...................................................... H04L 29/08
  USPC ............................................................ 709/226
  See application file for complete search history.

(56) References Cited

U.S. PATENT DOCUMENTS

| | | | | |
|---|---|---|---|---|
| 7,640,547 | B2* | 12/2009 | Neiman et al. | 718/104 |
| 8,179,809 | B1* | 5/2012 | Eppstein et al. | 370/252 |
| 9,081,623 | B1* | 7/2015 | Magerramov et al. | |
| 2006/0090162 | A1* | 4/2006 | Flores | G06F 8/67 718/104 |
| 2011/0010691 | A1* | 1/2011 | Lu | G06F 11/3688 717/124 |
| 2014/0007095 | A1* | 1/2014 | Campion | G06F 9/455 718/1 |
| 2014/0032761 | A1* | 1/2014 | Beveridge | 709/226 |
| 2014/0281026 | A1* | 9/2014 | Guo | G06F 9/5077 709/238 |
| 2015/0067171 | A1* | 3/2015 | Yum | H04L 67/2809 709/226 |

* cited by examiner

*Primary Examiner* — Yves Dalencourt
(74) *Attorney, Agent, or Firm* — Womble Carlyle Sandridge & Rice LLP; Jeffrey R. McFadden, Esq.

(57) ABSTRACT

A method for arranging services in a computing infrastructure is provided. The method includes receiving a request for services, with requested capabilities, to be provided from a computing infrastructure and reserving portions of the computing infrastructure until services, with at least the requested capabilities being reserved. The method includes committing the services with at least the requested capabilities, as reserved and providing the services, with at least the requested capabilities, in fulfillment of the request for the services, wherein at least one method operation is performed by a processor.

20 Claims, 6 Drawing Sheets

| Request for Services |||
|---|---|---|
| CPU | # Cores ||
| | Clock Frequency ||
| | Memory Per Core ||
| Storage | I/O Operations / Second | Sustained |
| | | Peak |
| | Data Protection Model ||
| | Capacity ||
| Network | Bandwidth ||
| | Latency ||
| | Isolation ||
| Business | Max Time to Recovery ||
| Other | Geographical ||
| | Affinity ||
| | Non-Affinity ||
| | Resource - Specific - Suggestions ||
| | Services Start ||
| | Services End ||
| | Bundled Services ||

302 – Request for Services
304 – CPU
306 – Storage
308 – Network
310 – Business
312 – Other

FIG. 3

CAPABILITIES SERVICE FRAMEWORK

BACKGROUND

Modern computing applications frequently require multiple machines to be implemented and deployed, connecting each machine to the appropriate network and storage devices. Implementations and deployments can be applied directly with physical computing resources, in which physical computing, storage, network and other resources in a computing infrastructure are arranged to suit the computing applications. Further, implementations and deployments can be applied with virtual computing resources in a virtualized computing environment, in which virtual computing resources are implemented and deployed, as supported by physical computing resources that implement the virtualized computing environment. The process of deploying an application requires matching the performance and service requirements of each machine required by the application with the capabilities of the infrastructure. Most deployments require IT specialists to manually match each infrastructure component to each of the application requirements. This results in a very static deployment, unable to easily benefit from new infrastructure components, or changes in application requirements.

Some environments attempt to address this limitation by defining "resource pools" into which the application may be deployed. This approach simplifies the process of matching application requirements against the infrastructure allowing applications to be deployed by non-experts (for example using a self-selection portal). However, poor granularity between pools frequently results in less than optimal use of the infrastructure components. Furthermore, the actual capabilities of the pool are not defined in terms of concrete semantics, e.g., processor clock rate, sustained IOPs (input/output operations per second), network bandwidth etc. Instead, pools may be defined with generic phrases (Gold, Silver, Bronze, etc.) that further complicate the process of selecting an appropriate pool, and result in a greater mismatch between the application needs and the infrastructure capabilities. A user may attempt to choose a best-fit from a generic description of two or more service pools, often resulting in either over- or under-specification of the infrastructure. In addition, applications cannot automatically benefit from improvements to infrastructure capabilities, if those new capabilities are closer to those demanded by the application.

SUMMARY

In some embodiments, a method for arranging services in a computing infrastructure is provided. The method includes receiving a request for services, with requested capabilities, to be provided from a computing infrastructure. The computing infrastructure may refer to storage infrastructure, networking infrastructure, and business continuance in some embodiments. The method includes reserving portions of the computing infrastructure until services, with at least the requested capabilities being reserved. The method includes committing the services with at least the requested capabilities, as reserved and providing the services, with at least the requested capabilities, in fulfillment of the request for the services, wherein at least one method operation is performed by a processor. In some embodiments a computer readable medium and a capabilities service framework system is provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is an example of a request for services, suitable for use in the capabilities service framework system of FIG. 1, in accordance with some embodiments.

DETAILED DESCRIPTION

A capabilities service framework system, and related method, offer solutions to the above-described problems. Embodiments of the system and method respond to a request for services to be provided from a computing infrastructure, which can be a physical computing infrastructure or a virtual computing infrastructure supported by a physical computing infrastructure. The request for services originates from an application, management software, an operating system, or the like, and specifies capabilities of the services to be provided in appropriate detail. In response to the request, various portions of the computing infrastructure are reserved. If the reserved portions of the computing infrastructure do not satisfy the request, these portions are released. If the reserved portions of the computing infrastructure can satisfy the request, a subset or all of the reserved portions of the computing infrastructure are committed, confirmed, and provided. Any portions of the computing infrastructure that were reserved, but are not ultimately provided, are released. Services from the computing infrastructure can be reallocated in a variety of scenarios, which will be further discussed along with representative examples. Requests for services to be provided presently, or services to be provided at a specified future time, can be accommodated.

Figure 1:
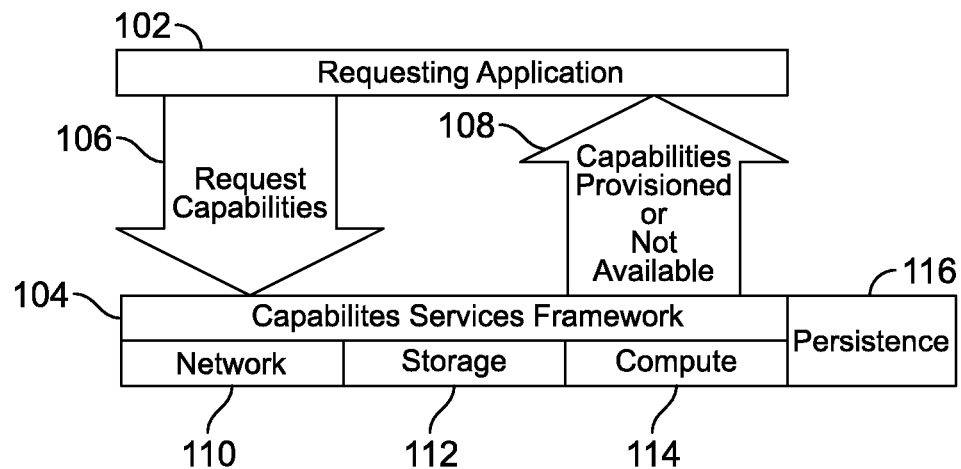
FIG. 1 is a schematic of a capabilities service framework system, in accordance with some embodiments.

FIG. 1 is a schematic of a capabilities service framework system, in accordance with an embodiment of the present disclosure. A requesting application 102 is shown making a request 106 to a capabilities service framework 104 for services to be provided from a computing infrastructure. In some embodiments, the requesting application is management software, an operating system, or the like. The request 106 indicates specific capabilities expected to be provided, and is part of an autonomous negotiation for services between the requesting application 102 and the capabilities service framework system. In the example shown, the computing infrastructure includes network services 110, storage services 112, and compute services 114. The network services 110, storage services 112 and compute services 114, and possibly additional services, are provided by underlying physical resources, e.g., computing devices, storage devices, network devices and so on. The capabilities service framework 104 could be implemented in (or under) an application programming interface (API), as software executing on a network appliance or other computing device, which could be in a data center with various physical resources, among other possibilities. It should be appreciated that the capabilities service framework 104 could execute in a physical computing environment or a virtual computing environment, and could apply to services in a physical computing infrastructure or a virtual computing infrastructure, or both. It should be further appreciated that a virtual computing environment is supported with a physical computing environment.

The capabilities service framework 104 communicates with the computing infrastructure and is aware of the services and capabilities available in the computing infrastructure. In response to receiving the request 106, the capabilities service framework 104 attempts to reserve sufficient services in the computing infrastructure to satisfy the request. The capabilities service framework 104 then indicates, to the requesting application 102, that the capabilities are provisioned, or the capabilities are not available. This indication 108 could come in the form of a message sent from the capabilities service framework 104 to the requesting application 102, a handshake, a signal, a posting of a status, or other indicator readily devised in accordance with the teachings disclosed herein. The indication 108 could come in the form of confirming that the services, with the requested capabilities, are available. In some embodiments, the arrival of the services provided serves as an indication of success in satisfying the request. It should be appreciated that indication 108 may also provide additional metadata, such as cost parameters in some embodiments.

A persistence module 116 tracks reservations and allocations of the services of the computing infrastructure, and maintains a persistent state of used (i.e., consumed) and available (i.e., free) services of the computing infrastructure. It should be appreciated that computing infrastructure may include network infrastructure, storage infrastructure, business continuance, and other infrastructure components. In case of a failure in the computing infrastructure, the state of the computing infrastructure can be restored via the persistence module 116. In cases of changes in the computing infrastructure, such as physical changes of resources, or changes in use of resources, the persistence module 116 supports continued operation of the applications making use of the services of the computing infrastructure. These and other aspects of the capabilities service framework system will be further discussed following presentation of the series of examples of FIGS. 2A-C and the request for services shown in FIG. 3. The persistence module 116 could be implemented as software executing on a processor, in a layer that communicates with the capabilities service framework 104 and the computing infrastructure. It should be appreciated that the embodiments may be implemented into a converged infrastructure architecture such as those offered by the assignee, as well as other converged infrastructure architectures.

Figure 2A:
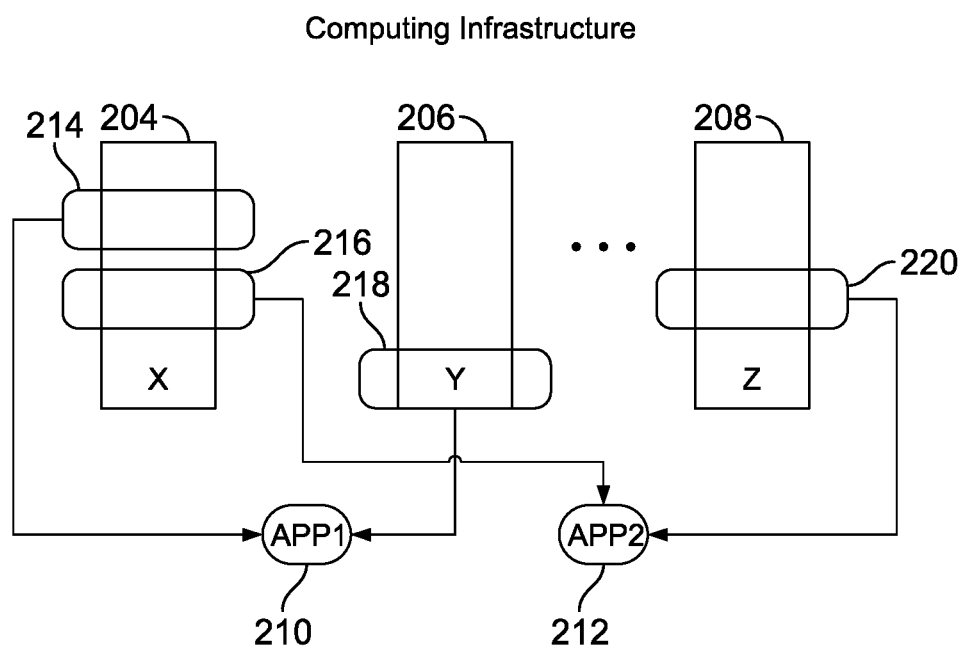
FIG. 2A is an activity diagram showing allocation of services in a computing infrastructure, in conjunction with operation of the capabilities service framework system of FIG. 1 in accordance with some embodiments.

FIG. 2A is an activity diagram showing allocation of services in a computing infrastructure, in an example consistent with operation of the capabilities service framework system of FIG. 1. Suppose, for purposes of illustration, that a computing infrastructure has X service 204, Y service 206 and Z service 208 available for allocation. The various services 204, 206, and 208 could include network services 110, storage services 112, and compute services 114 as shown in FIG. 1, in various mixes. A first application 210 and a second application 212 request services from the computing infrastructure. In response to these requests, which could be a single combined request or separate requests, the capabilities service framework system allocates a first portion 214 of services to the first application 210, a second portion 216 of services to the second application 212, a third portion 218 of services to the first application 210, and a fourth portion 220 of services to the second application 212. These allocations of services could be in the form of reservation of services, confirmation of services, or delivery of services (i.e., providing services), etc.

Figure 2B:
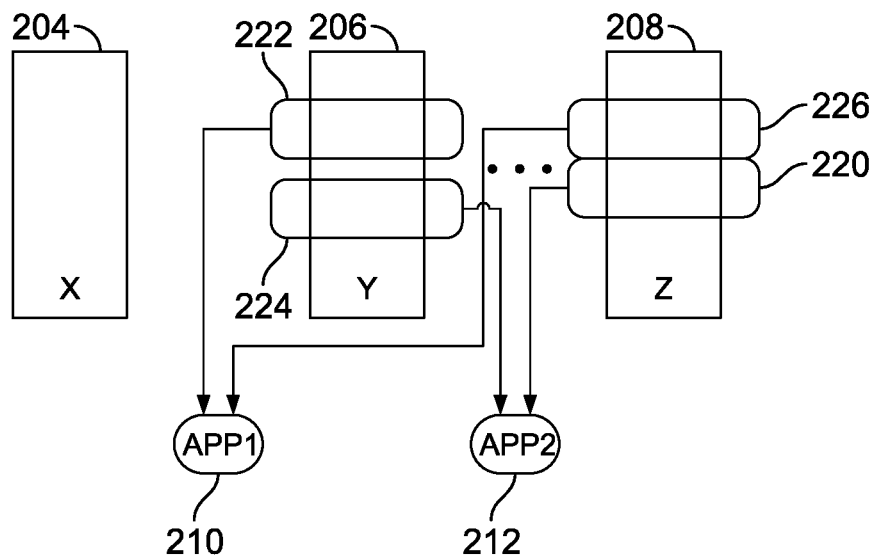
FIG. 2B is an activity diagram showing reallocation of services in the computing infrastructure, in conjunction with operation of the capabilities service framework system of FIG. 1, in accordance with some embodiments.

FIG. 2B is an activity diagram showing reallocation of services in the computing infrastructure, in an example consistent with operation of the capabilities service framework system of FIG. 1. In this example the same applications, namely the first application 210 and the second application 212, have a differing allocation of services. The capabilities service framework system allocates a fifth portion 222 of services to the first application 210, a sixth portion 224 of services to the second application 212, a seventh portion 226 of services to the first application 210, and the fourth portion 220 of services to the second application 212. Here, the fourth portion 220 of services is as previously allocated, but the remaining portions of services are newly allocated as compared with FIG. 2A. As in FIG. 2A, the allocations shown in FIG. 2B could be in the form of reservations, confirmations, or deliveries of services. The reallocation could occur for a variety of reasons, as will be further discussed with reference to FIGS. 1-3.

Figure 2C:
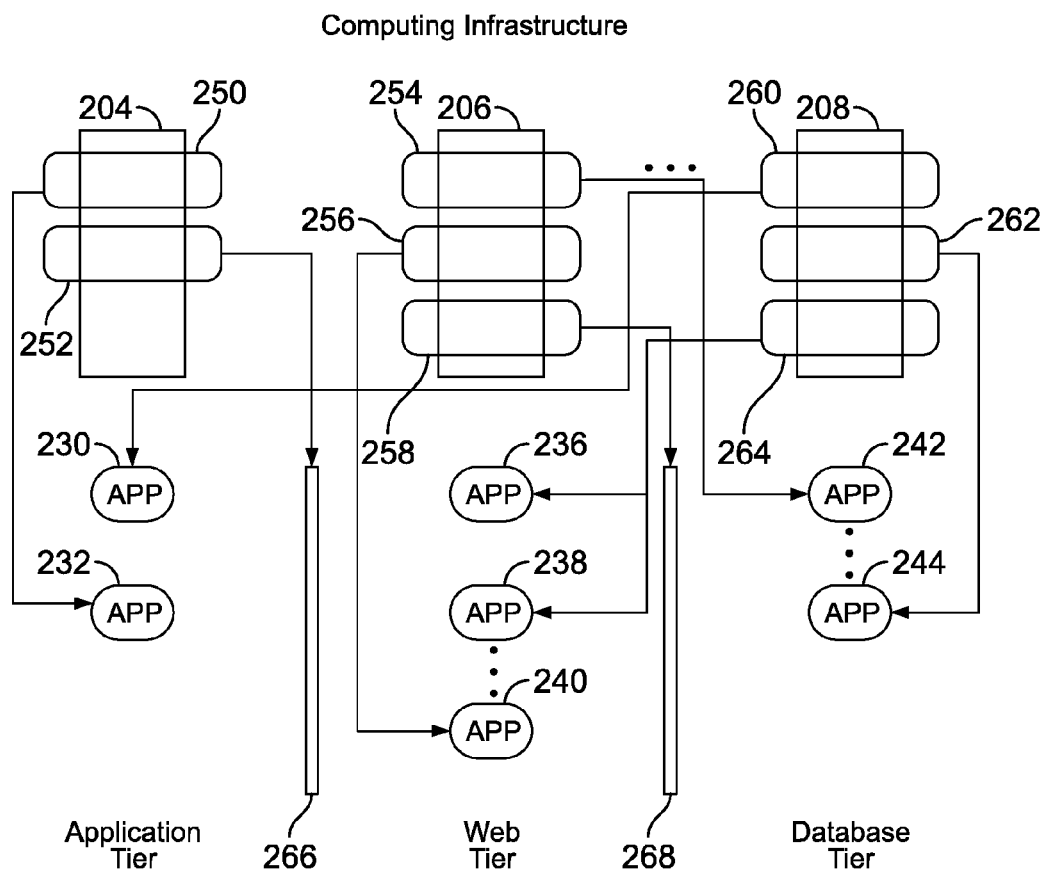
FIG. 2C is an activity diagram showing a further allocation of services in the computing infrastructure, in an example of a multi-tiered operation, in accordance with some embodiments.

FIG. 2C is an activity diagram showing a further allocation of services in the computing infrastructure, in an example of a multi-tiered operation, consistent with operation of the capabilities service framework system of FIG. 1. In this example of a multi-tiered operation, an application tier includes a third application 230, and a fourth application 232. A web tier includes a sixth application 236, a seventh application 238, and an eighth application 240. A database tier includes a ninth application 242 and a tenth application 244. The application tier is separated from the web tier by a first firewall 266. The web tier is separated from the database tier by a second firewall 268. A request for services, to be delivered from the computing infrastructure, could specify capabilities of the various services 204, 206, and 208. The request could be in the form of a single request, or multiple requests, and could originate from one or more of the applications 230, 232, 236, 238, 240, 242, 244 or from another application, e.g., an application as part of management software or an application as part of an operating system. In response to receiving the request for services, the capabilities service framework system reserves and provides an eighth portion 250 of services to the fourth application 232, a ninth portion 252 of services to the first firewall 266, a tenth portion 254 of services to a ninth application 242, an eleventh portion 256 of services to an eighth application 240, a twelfth portion 258 of services to the second firewall 268, a thirteenth portion 260 of services to the third application 230, a fourteenth portion 262 of services to a tenth application 244, and a fifteenth portion 264 of services to the sixth application 236 and the seventh application 238.

FIG. 3 is an example of a request 302 for services, suitable for use in the capabilities service framework system of FIG. 1. Although shown in the form of a table, it should be readily appreciated that the request 302 could take the form of a list, a pointer to a database, a data stream, a document, data parameters in memory, a data structure, a network packet, or other format as readily devised in accordance with the teachings disclosed herein. Requests could have fewer or a greater number of details, and could represent a single application or be combined for multiple applications, etc. In this example, the request 302 includes a request for capabilities of central processing unit (CPU) services 304, including the specified number of cores, the specified clock frequency, and the specified memory per core. The request 302 includes a request for capabilities of storage services 306, including the specified number of sustained input/output operations per second (sustained IOPs), the peak input/output operations per second (peak IOPs), and a data protection model. The data protection model could specify antivirus protection, backup requirements, bit corruption protection and so on. The request 302 includes a request for capabilities of network services 308, including a specified bandwidth, a specified latency, and specified isolation. The isolation requirements could specify firewall protection. The request 302 includes a request for business capabilities, such as the specified maximum time to recovery in the case of a single failure, or a multiple failure. Other capabilities 312 which could be specified in a request 302 for services could include geographical aspects, such as that the computing resources be located within a specified region, e.g., for tax purposes, legal reasons, or to preserve low latency. Specific details about affinity could be specified, such as that computing resources be located on the same blade or group of blades. Non-affinity could be specified, such as that computing resources be located on a differing blade or network from resources of a rival company or enterprise. It should be appreciated that request for services 302 is one example of a list of requests for capabilities and is not meant to be limiting as other request for capabilities may be included within the list.

In some embodiments, the request 302 can include resource-specific suggestions, which could be considered hints. Here, a requesting application can indicate a capability of a specific resource that would be desirable if available. Unlike the capabilities specified in the request 302, which capabilities should be considered essentially non-optional, the suggestions are not required to be fulfilled in the services delivered. For example, the suggestions could ask for a particular feature or capability of a specific machine, which feature or capability is not found on machines of other vendors or previous versions of a machine in a lineage. An example of such a feature is when two data centers are separated by a disjoint layer 2, and a request 302 includes a suggestion for a tunnel through the disjoint layer 2, which tunnel could be provided by a specific vendor. Another example of such a feature is when specific resources provide a 100 Mbps (megabits per second) reserved bandwidth link between two specified points. If the capabilities service framework 104 can match a suggestion to available specific services of the computing infrastructure, the capabilities service framework 104 reserves these. Another example of a hint is where a particular infrastructure can provide two or more solutions to a particular need, e.g., a backup operation. A hint can be used to request that the application be backed up by a particular service if that service is available. If the particular service is not available, then an alternate may be acceptable. For example, an alternate may be used where a service contract is already available with a backup vendor, and the customer would prefer to use that service contract rather than switch to a new service.

In the embodiment shown, the request 302 includes specification of when services start and when services end. In some embodiments, services to commence essentially immediately are so indicated in the request 302, and in other embodiments, this is assumed. In some embodiments, a termination time or date of services is so indicated in the request 302, in other embodiments the request is good until canceled. The request can thus indicate a present time interval, a future time interval, and open-ended time interval, a closed-ended time interval, or no specified interval. Various embodiments of the request 302 have variations in how time-dependent bookings or time-independent bookings are indicated, as is readily appreciated. The request 302 could include multiple time-dependent bookings, e.g. for staggered performance levels adjusted for expected peak loads of storage input/output or peak loads of computing power.

In some embodiments, cost-based bookings can be specified in the request 302. For example, the request 302 could include specification of services to be provided below a maximum cost, or in a range of costs. Service costs could be based on net, amortized or remaining value of equipment, or leasing costs of equipment, and when less expensive equipment is available for lower-cost services to be provided, this could satisfy a cost-based reservation. A booking could be based upon cost of electricity at various times during the day, or cost of air conditioning for computing facilities. The cost of electricity or cost of air conditioning could vary depending upon season or temperature, etc. The cost of electricity could also vary depending upon the efficiency of equipment available, and cost-based reservations could specify a total cost, an energy cost, or an equipment cost in a range or with an upper limit. A cost-based booking could conceivably specify a lower limit, as when only the newer equipment is desired. Further variations of cost-based bookings are readily envisioned in keeping with the teachings disclosed herein.

A blended class of machine with pre-defined capabilities could be offered as a bundle of services of the computing infrastructure. In the embodiment shown, the request 302 includes specification of bundled services. For example, firewall services could be bundled. Network balancer services could be bundled. Backup services could be bundled with storage types or sizes. Blades could be offered in a package. Types of storage and specified processors could be selected for workload and bundled.

With reference back to FIGS. 1-3, aspects of the embodiments of the capabilities service framework system and related method, and variations thereof, are discussed below. When the capabilities service framework 104 reserves services in the computing infrastructure, these services could be reserved in a virtual computing environment or in a physical computing environment, or in a combination of virtual and physical computing environments. When the capabilities service framework 104 reserves portions of a computing infrastructure, these can be portions of a virtual computing environment, portions of a physical computing environment, or portions of a combination of virtual and physical computing environments. It should be appreciated that the virtual computing environment is supported by physical computing resources so that, ultimately, portions of a physical computing infrastructure are providing underlying services that are then allocated as services provided from a virtual computing environment.

When the capabilities service framework 104 reserves portions of a computing infrastructure, this could be accomplished in a sequential process, a parallel process, an iterative process, or a combination of these. Some embodiments use retries for the reservation process. Some embodiments establish a time period for making reservations or retrying reservations, or a specified number of retries to be applied in the reservation process. In one embodiment, the capabilities service framework 104 reserves portions of the computing infrastructure until services with at least the requested capabilities are reserved, or the services failed to reserve. This type of reservation could be performed in a single pass through the services, or with the above-discussed number of retries or time span for attempting to complete a reservation of sufficient services to satisfy the request. In case of a failure to reserve sufficient services to satisfy the request, services or portions of the computing infrastructure that are reserved are then released.

The reservation process could include checking as to whether the services, with the requested capabilities, are available from the computing infrastructure. Each portion of the computing infrastructure is then reserved as the portion of the computing infrastructure is not available, in an attempt at a reservation of services with at least the requested capabilities. In one embodiment, services or portions of the computing infrastructure are reserved. If another service or portion of the computing infrastructure is found or becomes available, which better matches capabilities in the request, that newer service or portion of the computing infrastructure could be reserved and the earlier reserved service or portion of the computing infrastructure is then released. In such an iterative process, the cumulative set of services reserved converges toward satisfaction of the request. See, for example, FIG. 2A and FIG. 2B, which show a reallocation process. In this manner, a request could be satisfied early on with a reservation of services with a surplus of capabilities, and the reservation process could exchange services to narrow down the surplus of capabilities, releasing some, and reserving others, until a specified criterion is met. This criterion could be an elapse of a time period, a number of iterations, a specified closeness to requested capabilities, a match of a price of the services to a requested price range, or other criterion as readily devised in accordance with the teachings disclosed herein.

Reservations could be for services that are presently available, i.e. that can be delivered essentially immediately or on short notice, or for services that will be available during a specified time span, i.e., reservation for services for a future time. Services that are presently engaged could indicate they will be available at a future time, i.e., will be available during a specified time span, or a database showing bookings of services could be consulted to indicate when services are or will be available.

In some embodiments, the capabilities service framework 104 (shown in FIG. 1) communicates with, allocates, and directs the services of the computing infrastructure. It is via this communication that the capabilities service framework 104 can determine when services are available, and whether the services match the requested capabilities from the request 302. The capabilities service framework 104 can interrogate capabilities of the computing infrastructure, in some versions, and match infrastructure-specific features, as determined from interrogating the capabilities of the computing infrastructure, to a suggestion from the request 302. If services providing at least the requested capabilities are not available, or if the capabilities service framework 104 cannot successfully interpret the request or understand the infrastructure-specific features suggested in the request, the capabilities service framework 104 so indicates, e.g. by providing a message to that effect.

Once services with at least the requested capabilities are reserved, the services can be committed. The commitment process can be termed an "atomic grab", in which at least a subset of the reserved services is committed to the request. The reason why this might take only a subset of the reserved services is as follows. During the reservation process, it is possible that too many services, or services with a surplus of capabilities, have been reserved. It might take only a subset of the reserved services to satisfy the request. This subset is then committed to the request. It is also possible that exactly the correct amount of services have been reserved to satisfy the request, in which case the entirety of the reserved services is then committed to the request. This subset, or entirety as the case may be, of the reserved services is held until the services are provided, which could be essentially immediately, or at a later time as specified in the request. Any remaining reserved portions of the computing infrastructure which are not being held for providing the services are then released.

Without the "atomic grab", a system might attempt to reserve sufficient services in a computing infrastructure, to satisfy a request, and then release all of the reserved services when unable to satisfy the request. The system would then retry, release, retry, release and so on. Or, a system might have to reserve a service, provide the service, then go reserve another service, provide that service and so on, and end up providing a jumble of services that doesn't necessarily match the requested capabilities optimally. With the "atomic grab", the capabilities service framework system can reserve each service or portion of the computing infrastructure as such becomes available, continue grabbing as more become available, and then when sufficient services have been reserved, commit all or a subset of these to satisfy the request. The "atomic grab" allows management software or an application to ask for capabilities all at once, and receive back services with all of the capabilities asked for, or a commitment to provide these at a future specified time.

The committed, reserved services are then directed per the request 302. Such direction could take the form of arranging for delivery of the services, e.g., by communication between the capabilities service framework 104 and the various services in the computing infrastructure. This fulfills the request, in that the services delivered satisfy the requested capabilities from the request 302.

In some embodiments, services are delivered in accordance with a local policy that is implemented in the Capabilities Services Framework, 104, independent of the capabilities requested by the Requesting Application, 102. For example, there could be an oversubscription policy that specifies 2× oversubscription (or another number). The same number of processor cores requested by two differing applications could be delivered to both applications, relying on this number of processor cores in the computing infrastructure. That is, for example, six processor cores could be allocated to each of two applications, with each application specifying six processor cores, and with 2× oversubscription. In a related manner, ballooning technology can fill in memory that has been oversubscribed. For example, 16 GB (gigabytes) of RAM (random access memory) in the computing infrastructure could be delivered to each of two applications, each application specifying 16 GB of RAM, with 2× oversubscription. In a further related manner, a local policy of thin provisioning of disk space could be applied. For example, 4 TB (terabytes) of disk space could be provided to each of four subscribers, each requesting 4 TB of disk space. The disk space is thus provided at a lower level than requested, and filled in if there is a temporary demand. These and other local policies could be administered in accordance with the computing infrastructure provider.

Migration is offered, in some embodiments. Migration, from a first allocation to a second allocation of services from the computing infrastructure, can be in response to a variety of situations. The capabilities service framework system can migrate from a "too good" allocation to an "acceptable" allocation of services from the computing infrastructure. The first allocation of services could provide an excess of capabilities relative to the request, in which case a reallocation could provide a second allocation of services. A second allocation of services could provide an improved match of capabilities relative to the request, as compared to the first allocation of services. For example, suppose a surplus of capabilities is provided by an allocation of services that has been reserved and delivered (see, e.g., FIG. 2A) in response to a request from an application. This allocation of services provides in excess of the requested capabilities. As services become freed which more closely match the requested capabilities, without so large an excess, the capabilities service framework reallocates services (see, e.g., FIG. 2B), reserving some, freeing up others, so that the services provided in response to the request more closely match the requested capabilities. Services freed up from the initial allocation are then available for reserving in response to further requests, e.g., from other applications.

In some embodiments, the capabilities service framework 104 responds to a request 302 with a value or values of services that are available, so that an application can negotiate as to whether to accept these services. For example, a first allocation of services with excess capabilities could be available at a higher cost, which an application could accept, or the application could decline and wait for a specified period of time to see if an allocation of services at a lower cost becomes available. The value could further represent some aspect of the services besides price. This type of negotiation can also be applied to time-dependent booking, in which varying levels of capabilities are the reserved ahead of the lock-in, and the application selects from among these.

Reallocation and redistribution, as shown in FIGS. 2A and 2B, can also be used for mixed use of computing infrastructure, freeing up portions of computing infrastructure, and repair, replacement or upgrade of portions of the computing infrastructure. For example, a set of services or resources in a computing infrastructure could be allocated to a single application or a set of applications, or could be sliced up and allocated to multiple applications or differing sets of applications. A set of services or resources that is divided or allocated to multiple applications or differing sets of applications could be reallocated to a single application or a set of applications by swapping out with services or resources as these become available, and vice versa. See, for example, FIG. 2B where a set of services 204 is freed up by reallocating portions of the computing infrastructure as compared to FIG. 2A. This could be applicable to a physical computing environment or a virtual computing environment. Virtual machines could be moved from a first physical allocation to a second physical allocation, in order to free up a resource.

A resource could be replaced in the computing infrastructure. A new resource could be added in the computing infrastructure. In the case of failed physical components or resources, or physical components or resources targeted for replacement, such reallocation and redistribution actions could free up a component or resource, similar to the unallocated service 204 shown in FIG. 2B. The freed up component or resource could then be physically removed and repaired or replaced. In the case of an upgrade or added component, service or resource, the component, service or resource becomes available for new allocation. New capabilities could be requested. All of the above activities can be coordinated with or managed by the capabilities service framework 104, through communication with the computing infrastructure.

If or when there is a failure in the computing infrastructure, the persistence module 116 is available to facilitate continued operation of applications making use of services from the computing infrastructure. Since the persistence module 116 maintains an indication of the state of the computing infrastructure, the state of the computing infrastructure can be restored after a failure. Restoring could include reallocating services to replace services discontinued on account of the failure, and could also include reallocating services to free up a resource that needs replacement as a result of the failure. The capabilities service framework 104 would work in concert with the persistence module 116, to continue delivering services to applications in fulfillment of the associated requests via redistribution of services as described above. Processes of determining what services are available, reserving services, committing services and providing services from the computing infrastructure are applied by the capabilities service framework 104 and the persistence module 116 to work around failed areas in the computing infrastructure. In this manner, the capabilities service framework 104 redistributes physical allocation in the computing infrastructure to provide continued operation for the request. The persistence module 116 provides a way to commit to a set of services, even in varying circumstances or with changes in the computing infrastructure.

Figure 4:
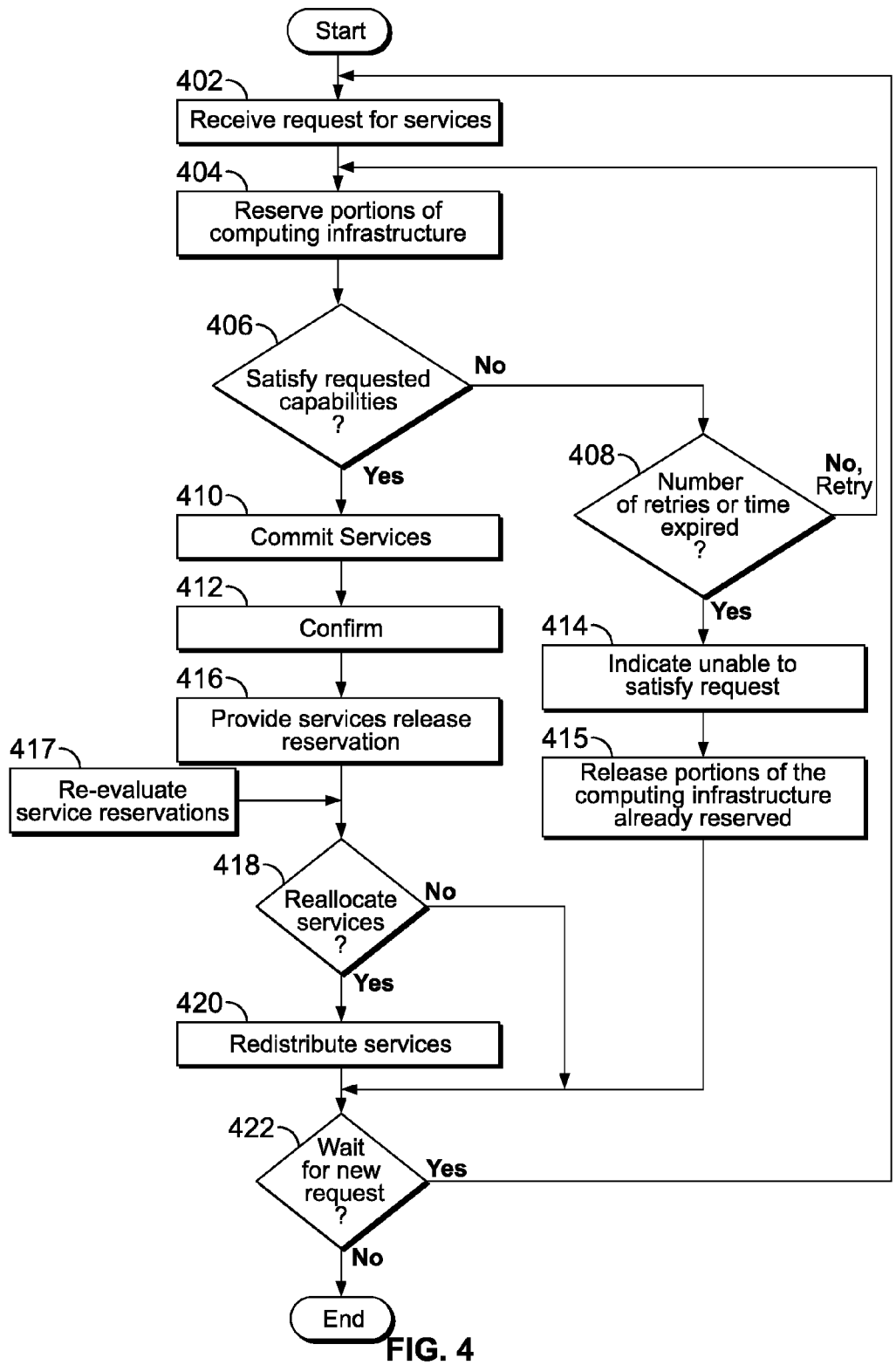
FIG. 4 is a flow diagram of a method of arranging services in a computing infrastructure, which can be practiced using the capabilities service framework system of FIG. 1 and the request for services of FIG. 3, in accordance with some embodiments.

FIG. 4 is a flow diagram of a method of arranging services in a computing infrastructure, which can be practiced using the capabilities service framework system of FIG. 1 and the request for services of FIG. 3. The above-discussed scenarios, examples and embodiments can be supported using embodiments of the disclosed method, and variations thereof.

A request for services is received, in an action 402. For example, the capabilities service framework receives a request from an application. The request specifies capabilities to be delivered from a computing infrastructure. Portions of a computing infrastructure are reserved, in an action 404. As discussed above, various processes for reserving could include iteration, swapping, converging, negotiation, and so on.

In a decision action 406, the question is asked, are the requested capabilities satisfied? If the answer is yes, sufficient services to satisfy the capabilities specified in the request are presently reserved, flow proceeds to the action 410. If the answer is no, there are not sufficient services reserved to satisfy the capabilities specified in the request, flow branches to the decision action 408.

In the decision action 408, the question is asked, has a number of retries or a time span expired? In some embodiments another form of determining whether a limit has been reached may be utilized in place of the number of retries or time span. If the answer is yes, the number of retries or the time span has expired, flow proceeds to the action 414. If the answer is no, the number of retries or the time span has not expired, there is a retry, and flow branches back to the action 404 so that the action of reserving portions of the computing infrastructure can be continued. In the action 414, an indication is produced that indicates inability to satisfy the request. For example, as discussed above, a message could be sent, a status could be set, or the capabilities service framework could otherwise communicate a negative result to the application. In operation 415 portions of the computing infrastructure already reserved that are related to the inability to satisfy the request of operation 414 are released and become available for future reservations or requests.

In the action 410, services are committed. It should be appreciated that the services that are reserved in the computing infrastructure, and that satisfy the requested capabilities, are committed. The commitment of the services is confirmed, in an action 412. The services are provided, and unused reservations, i.e., unused reserved services, are released, in an action 416. In a decision action 418, the question is asked, should services be reallocated? Reallocation could be called for under a number of circumstances, such as a new request, a re-evaluation of service reservations, changes in the computing infrastructure, availability of a better match to a request, variations in time-dependent bookings, a failure, and so on. If the answer is no, services should not be reallocated, flow branches to the decision action 422. If the answer is yes, services should be reallocated, flow branches to the action 420, in which the services are redistributed. Action 417, which is optional, feeds into action 418 in some embodiments. Action 417 enables the ability to reallocate service reservations that are operational.

In the decision action 422, the question is asked, should the system wait for a new request? If the answer is no, the next action is an endpoint. If the answer is yes, the system should wait for a new request, flow branches back to the action 402, to receive a new request for services. The method could have variations in which the endpoint shown branches to other processes or portions of the flow.

Figure 5:
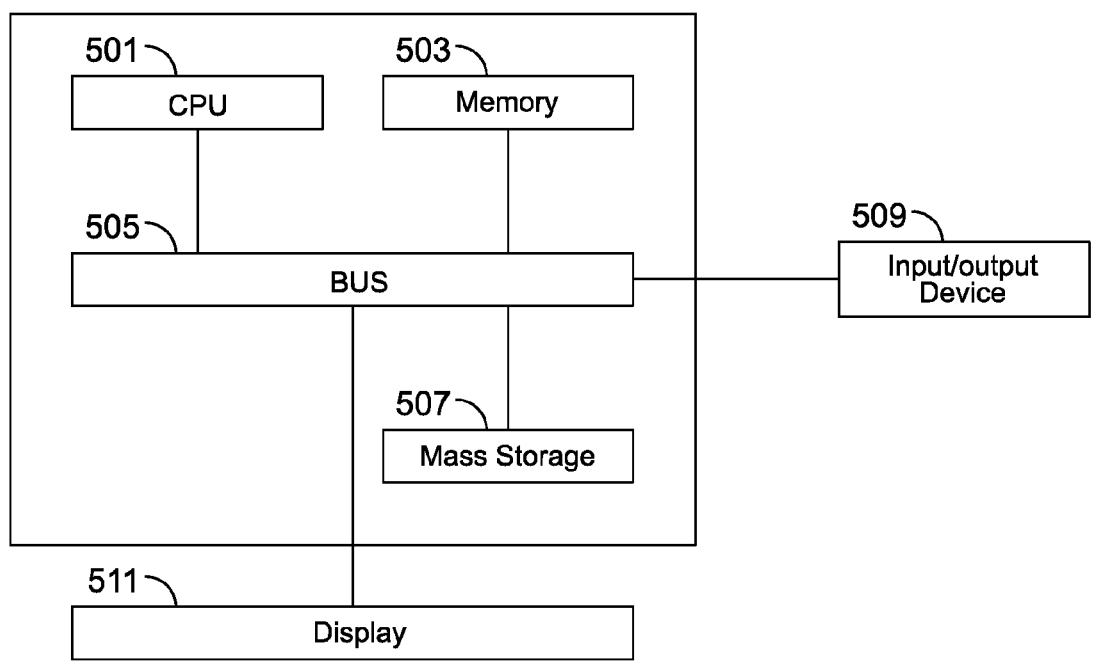
FIG. 5 is an illustration showing an example of a computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for arranging services in a computing infrastructure in accordance with some embodiments. In some embodiments, the computing device represents a commercially available converged infrastructure. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. In some embodiments, a network using a network protocol such as Hyper Text Markup language (HTML) may be utilized for communication with the components within the system of FIG. 5. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a non transitory, tangible, computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for arranging a service in a computing infrastructure, comprising:

receiving a service request, wherein the service request is comprised of a request for one of a plurality of services of a computing infrastructure, wherein the service request includes a capability request, wherein the capability request is comprised of a request that the requested service has a specific capability, and wherein the plurality of services is comprised of network services, storage services and compute services provided by underlying physical resources;

comparing the service request with prior reservations and allocations of services of the computing infrastructure;

identifying an available portion of the computing infrastructure based upon the comparing of the service request, wherein the available portion has at least the requested capability;

committing the available portion of the computing infrastructure having at least the requested capability, as reserved;

providing the available portion of the computing infrastructure having at least the requested capability, as committed, in fulfillment of the service request;

identifying excess capabilities between the capability request and the available portion;

determining, in response to the identifying of the excess capabilities, that a closer match to the capability request is available; and migrating, in response to the determining of the availability of the closer match, from a first allocation of the requested service that has been reserved and delivered from the computing infrastructure to a second allocation of the requested service, wherein the second allocation of the requested service comprises the discovered available closer match to the capability request, wherein at least one method operation is performed by a processor.

2. The method of claim 1, further comprising:

setting a time period for reserving the available portion of the computing infrastructure;

releasing a reservation of the available portion of the computing infrastructure in response to an occurrence that the available portion of the computing infrastructure with at least the requested capability failed to reserve prior to expiration of the time period.

3. The method of claim 1, wherein committing the available portion of the computing infrastructure includes:

holding at least a subset of the reserved available portion of the computing infrastructure, the at least a subset of the reserved available portion of the computing infrastructure satisfying the service request with the requested capability, until the requested service is provided; and releasing any remaining available portion of the computing infrastructure not held in the at least a subset of the reserved available portion of the computing infrastructure.

4. The method of claim 1, wherein:

the service request includes requesting a cost-based booking of the requested service with the requested capability; and the requested service is reserved, committed and provided in accordance with the cost-based booking.

5. The method of claim 1, wherein:

the service request includes requesting a time-dependent booking of the available portion of the requested service with at least the requested capability on one of: a present time interval, or a future time interval; and the available portion of the requested service is reserved, committed and provided in accordance with the time-dependent booking.

6. The method of claim 1, wherein the migrating from a first allocation of the requested service provided from the computing infrastructure to a second allocation of the requested service provided from the computing infrastructure, in response to a situation from a group consisting of:

the second allocation of the requested service provides an improved capability relative as compared to the first allocation of the requested service;

a new capability is requested;

a virtual machine is moved from a first physical allocation to a second physical allocation in order to free up a resource;

a resource is replaced in the computing infrastructure; and a new resource is added in the computing infrastructure.

7. A non-transitory, tangible, computer-readable medium having instructions thereupon which, when executed by a processor, cause the processor to perform a method comprising:

receiving a service request, wherein the service request comprises a request for one of a plurality of services of a computing infrastructure, wherein the service request includes a capability request, wherein the capability request is comprised of a request that the requested service has a specific capability, and wherein the plurality of services is comprised of network services, storage services and compute services provided by underlying physical resources;

comparing the service request with prior reservations and allocations of services of the computing infrastructure;

identifying an available portion of the computing infrastructure based upon the comparing of the-service request, wherein the available portion has at least the requested capability;

committing the available portion of the computing infrastructure having at least the requested capability, as reserved;

providing the available portion of the computing infrastructure having at least the requested capability, as committed, in fulfillment of the service request;

identifying excess capabilities between the capability request and the available portion;

determining, in response to the identifying of the excess capabilities, that a closer match to the capability request is available; and migrating, in response to the determining of the availability of the closer match, from a first allocation of the requested service that has been reserved and delivered from the computing infrastructure to a second allocation of the requested service, wherein the second allocation of the requested service comprises the discovered available closer match to the capability request.

8. The computer-readable medium of claim 7, wherein the method further comprises:

indicating that the requested service, with the requested capability, is unavailable, in response to an inability to satisfy the requested capability with the available portion of the computing infrastructure, as reserved; and retrying to reserve the available portion having the requested capability, in response to the inability to satisfy the requested capability, the retrying taking place for one of: a specified time interval, or a specified number of retries.

9. The computer-readable medium of claim 7, wherein the method further comprises:

providing the requested service, in accordance with a local policy requirement, the local policy requirement being selected from a group consisting of: affinity, non-affinity, oversubscription of compute resources, and thin provisioning of storage.

10. The computer-readable medium of claim 7, wherein the method further comprises:

maintaining an indication of a state of the computing infrastructure, including free and consumed resources, in a persistence store, in such a manner that the state of the computing infrastructure can be restored after a failure.

11. The computer-readable medium of claim 7, wherein the available portion of the computing infrastructure is found available as one of: presently available, or available during a specified time span.

12. The computer-readable medium of claim 7, wherein details of the requested capability include a firewall between at least two tiers of a multi-tiered operation, the at least two tiers including from a group consisting of: an application tier, a web tier, and a database tier.

13. The computer-readable medium of claim 7, wherein details of the requested capability are selected from a group consisting of: an available portion of the computing infrastructure to be within a specified geographic location, business continuance requirements, and a maximum time to recovery from a single failure.

14. The computer-readable medium of claim 7, wherein an attempt at the reservation of an available portion of the computing infrastructure includes at least one iteration of reserving and releasing various portions of the computing infrastructure, converging towards satisfaction of the service request.

15. A capabilities service framework system, comprising:

a processor, configured to:

receive a service request, wherein the service request is comprised of a request for one of a plurality of services of a computing infrastructure, wherein the service request is comprised of a capability request, wherein the capability request is comprised of a request that the requested service has a specific capability, and wherein the plurality of services is comprised of network services, storage services and compute services provided by underlying physical resources;

compare the service requests with prior reservations and allocations of services of the computing infrastructure;

identify an available portion of the computing infrastructure based upon the comparing of the service request, wherein the available portion has at least the requested capability;

commit the available portion of the computing infrastructure having at least the requested capability, as reserved;

provide the available portion of the computing infrastructure having at least the requested capability, as committed, in fulfillment of the service request;

identify excess capabilities between the capability request and the available portion;

determine, in response to the identifying of the excess capabilities, that a closer match to the requested capability is available; and migrate, in response to the determining the availability of the closer match, from a first allocation of the requested service that has been reserved and delivered from the computing infrastructure to a second allocation of the requested service, wherein the second allocation of the requested service comprises the discovered available closer match to the requested capability.

16. The capabilities service framework system of claim 15, further comprising:
   the processor further configured to:
      interrogate capabilities of the computing infrastructure; and
      match infrastructure-specific features, as determined from interrogating the capabilities of the computing infrastructure, to a suggestion from the capability request.

17. The capabilities service framework system of claim 15, wherein:
   the service request is from a group consisting of: an application, a management layer, and an operating system; and
   the service request is a portion of an autonomous negotiation for services between the one from the group and the capabilities service framework system.

18. The capabilities service framework system of claim 15, further comprising:
   a persistence module, configured to track reservations and allocations of the requested service of the computing infrastructure, and to maintain a persistent state of used and available services of the computing infrastructure.

19. The capabilities service framework system of claim 15, wherein a blended class of machine with pre-defined capabilities is offered as a bundle of services of the computing infrastructure.

20. The capabilities service framework system of claim 15, wherein the processor is further configured to redistribute physical allocation in the computing infrastructure to provide continued operation for the service request.

* * * * *